E. Quinn,
Steam-Boiler Water-Feeder.
N° 53,042. Patented Mar. 6, 1866

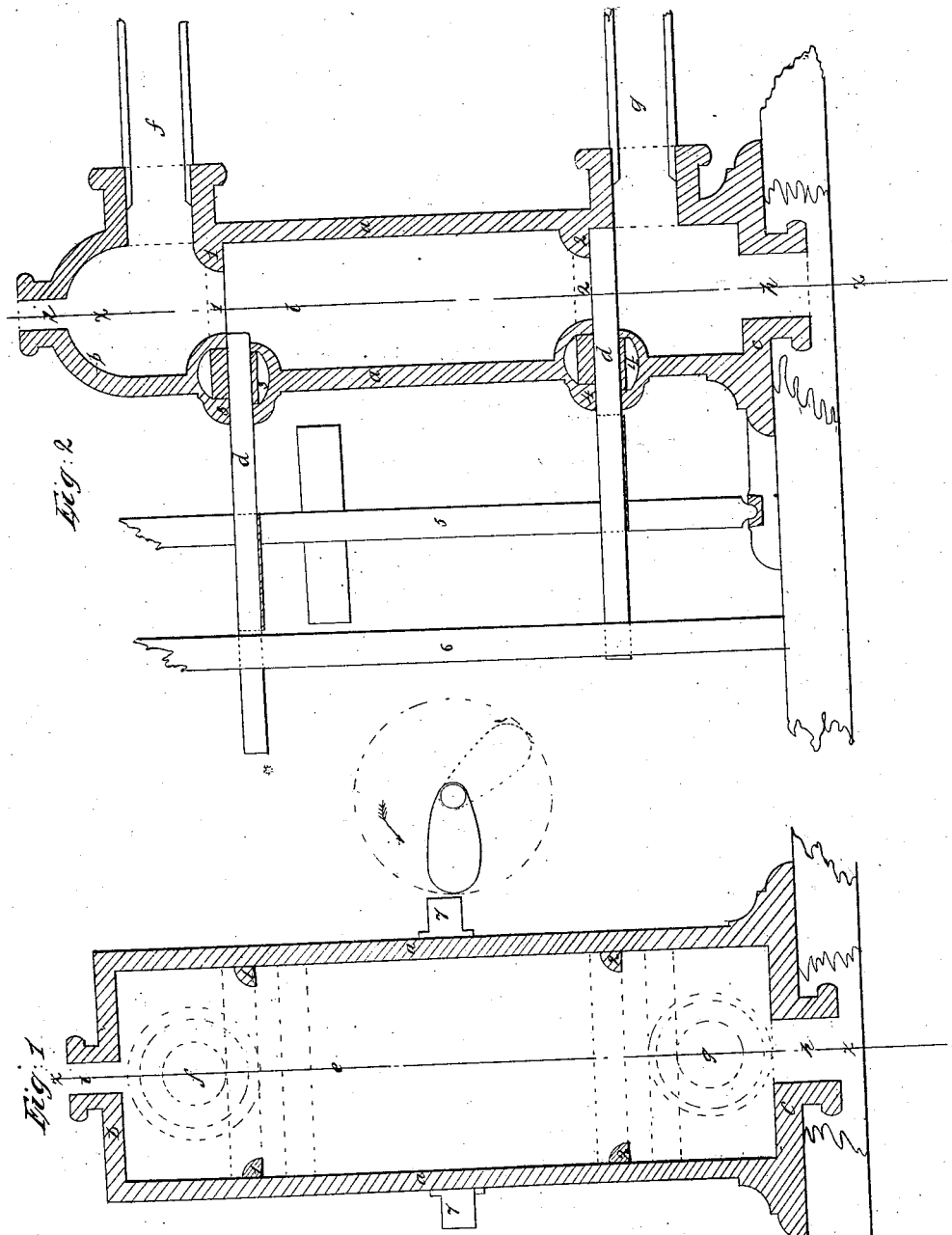

UNITED STATES PATENT OFFICE.

EMMETT QUINN, OF WASHINGTON, DISTRICT OF COLUMBIA.

IMPROVEMENT IN AUTOMATIC BOILER-FEEDERS.

Specification forming part of Letters Patent No. 53,042, dated March 6, 1866; antedated February 3, 1866.

*To all whom it may concern:*

Be it known that I, EMMETT QUINN, of the city of Washington, District of Columbia, have invented a new and Improved Device for Feeding Water into Boilers; and I do hereby declare that the following is a full and exact description, reference being had to the accompanying drawings, and to the letters of reference marked thereon.

The nature of this invention consists in the combination and arrangement of devices with a box or tube to be connected to a steam-boiler at about the same level that the water is intended to be maintained in the boiler, in the front of which box are two transverse slots, one near the top, the other near the bottom, so constructed as to constitute stuffing-boxes, through which move slides or gates, the sides of which are supported by narrow ledges projecting inward from the sides of the box. These gates are made to open and close alternately, the bottom remaining closed, while the top one opens and shuts, and vice versa.

To enable others skilled in the art to make and use my invention, I will proceed to describe its construction and operation.

Figure 2:
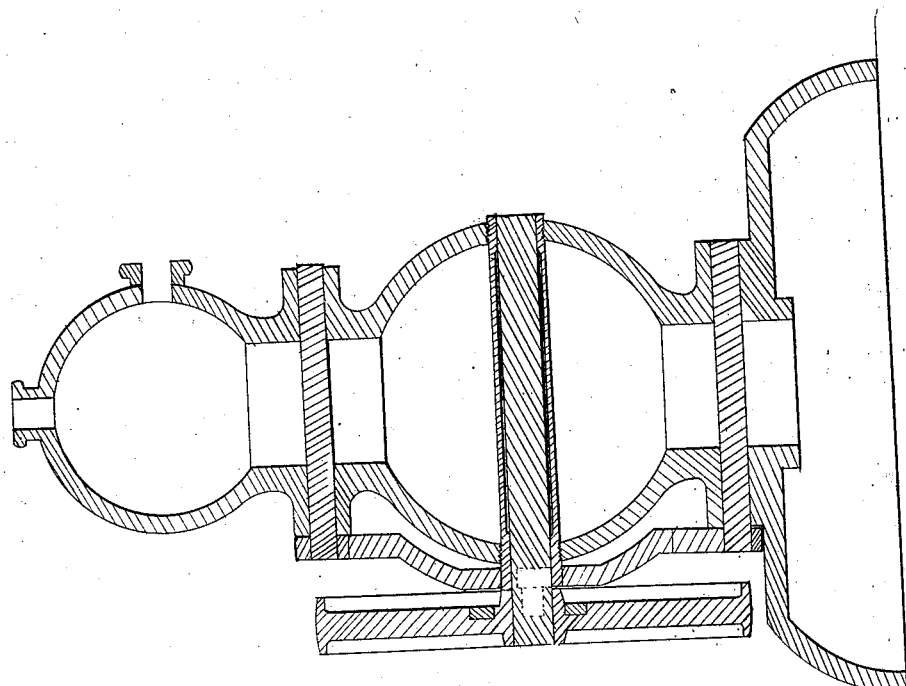
Figure 1:
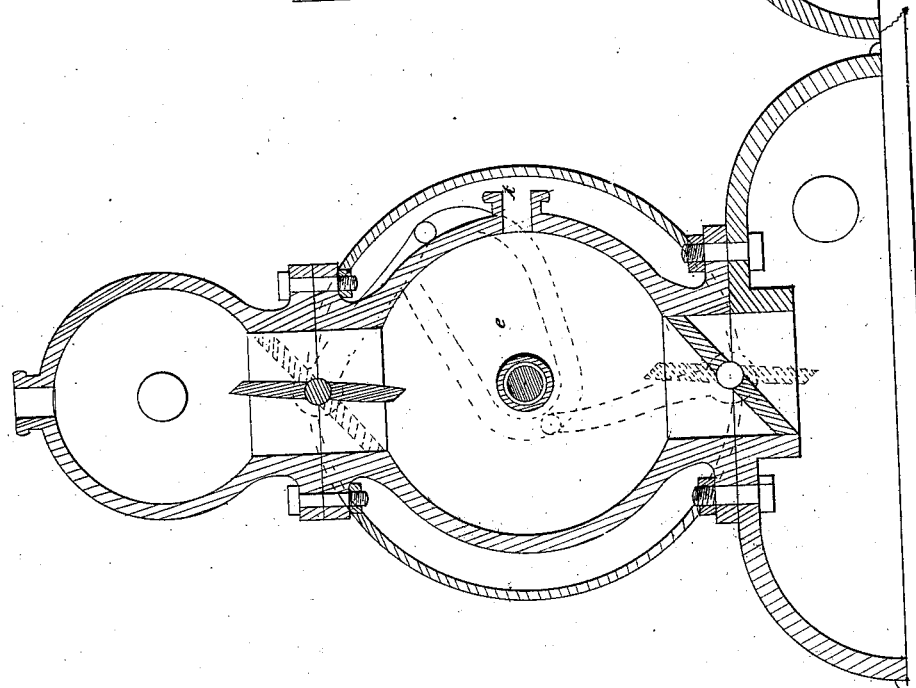

Figure 1 is a view of front elevation on red line $x'$ $x'$, Fig. 2. Fig. 2 is a view of the side elevation on line $x$ $x$, Fig. 1.

The letters $a$ $a$ $a$ $a$, Figs. 1 and 2, are the sides of the box. $b$ $b$ $c$ $c$ are the top and bottom.

The sliding valves or gates are represented by $d$ $d$, the bottom one of which is closed and the upper one shown open or drawn out to allow the water to enter the chamber $e$ from the supply-pipe $f$.

The pipe $g$ connects with the steam-space of the boiler or steam-drum, while through the pipe $h$ the water is fed into or near the bottom of the boiler.

The ledges or projections 1 1 and 2 2 (shown in Figs. 1 and 2) are bearings, and the larger ones, 3 and 4, are stuffing-boxes for the slides, the portions shaded by diagonal lines being of some anti-frictional substance, and those by horizontal lines of some elastic substance.

The socket $i$ at top is for the purpose of attaching an air-chamber when necessary.

A shaft, 5, with eccentrics working in slots in the outer ends of the slides, supported by a port, 6, may be employed to give motion to the valves; but this may be accomplished by various means, and a further description thereof is not considered necessary.

The gates may be made longitudinally the shape of the segment of a circle, the diameter of which would be the distance apart of the two gates, and secured to radial arms pivoted to the center of the narrow sides of the box, as shown at 7, Fig. 1.

The ordinary water-cock balance or throttle valve, as shown in Sheet 2, might be used instead of the valves or gates herein shown and described, but are believed to be more expensive and less durable.

The operation of this device is as follows: The water is let in at pipe $p$ and passes through the upper gate or valve, which is open, into the chamber $e$, the bottom gate being closed. When the chamber is supplied with water the upper gate is closed, the lower one opened, and the water falling below is conducted by the pipe $h$ into the boiler. The chamber $e$ is then supplied with steam from the pipe $g$, the lower valve is next closed, the upper one opened, and the water mingling with the steam the latter is condensed and the water again enters the chamber, and the operation described is repeated. When the water attains the level of the upper side of the pipe $g$ and shuts off the steam the water will not be discharged from the chamber $e$, and the water in the boiler will not therefore exceed that level. The same result can be obtained by admitting steam into the middle chamber, $e$, directly from the boiler, as shown at $k$ in Figs. 1 and 2, Sheet 2; but, as it would require another valve and produce no corresponding benefit, I prefer the construction before described.

Having thus described my invention, what I claim as new, and desire to secure by Letters Patent, is—

1. The combination of the box with a steam-generator and the sliding valves $d$ $d$.

2. The arrangement of the pipe $f$, for supplying the chamber $e$, steam-pipe $g$, connected with the boiler at the steam-space, the ingress-pipe $h$, connected with the boiler at its water-space, the projections 1 1 and 2 2, stuffing-boxes 3 and 4, the shaft 5, with its eccentrics and pulley, whereby to give motion to the slides $d$ $d$, substantially in the manner and for the purpose as herein set forth.

EMMETT QUINN.

Witnesses:
JOHN S. HOLLINGSHEAD,
JOHN D. BLOOR.